(12) United States Patent
Kim

(10) Patent No.: US 9,310,893 B2
(45) Date of Patent: Apr. 12, 2016

(54) MOBILE TERMINAL HAVING QWERTY KEY LAYOUT AND METHOD OF SETTING AND INPUTTING SYMBOL THEREIN

(75) Inventor: Nam Hee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2214 days.

(21) Appl. No.: 12/357,058

(22) Filed: Jan. 21, 2009

(65) Prior Publication Data

US 2009/0184928 A1 Jul. 23, 2009

(30) Foreign Application Priority Data

Jan. 23, 2008 (KR) .................. 10-2008-0007170

(51) Int. Cl.
*G06F 3/02* (2006.01)
*G06F 3/023* (2006.01)

(52) U.S. Cl.
CPC ......... *G06F 3/0238* (2013.01); *H04M 2250/70* (2013.01)

(58) Field of Classification Search
USPC .......................................... 345/169; 455/566
See application file for complete search history.

(56) References Cited

U.S. PATENT DOCUMENTS

| | | | |
|---|---|---|---|
| 7,218,313 B2 * | 5/2007 | Marcus et al. ................. | 345/169 |
| 7,439,957 B2 * | 10/2008 | Chu et al. ....................... | 345/169 |
| 7,791,592 B2 * | 9/2010 | Curelet-Balan ............... | 345/168 |
| 8,060,839 B2 * | 11/2011 | Min et al. ....................... | 715/816 |
| 2004/0222963 A1 * | 11/2004 | Guo et al. ...................... | 345/156 |
| 2005/0003868 A1 * | 1/2005 | Oh ................................ | 455/566 |
| 2006/0053386 A1 * | 3/2006 | Kuhl et al. ..................... | 715/773 |
| 2008/0001788 A1 * | 1/2008 | Min et al. ......................... | 341/23 |
| 2010/0066764 A1 * | 3/2010 | Refai ............................. | 345/660 |
| 2012/0032889 A1 * | 2/2012 | Griffin et al. ................. | 345/169 |

FOREIGN PATENT DOCUMENTS

KR 10-0690961 B1 2/2007

* cited by examiner

*Primary Examiner* — Van Chow
(74) *Attorney, Agent, or Firm* — Jefferson IP Law, LLP

(57) ABSTRACT

A mobile terminal having a QWERTY key layout and a method of setting and inputting a symbol therein are provided. The method of setting a symbol in a mobile terminal having a QWERTY key layout includes selecting a setting function of a symbol defined a user; adding, if the selected setting function comprises an addition function, a selected symbol to a key mapping table, deleting, if the selected setting function comprises a deletion function, a selected symbol from the key mapping table, and changing, if the selected setting function comprises a change function, a selected symbol to another selected symbol. Therefore, symbols frequently used by a user can be viewed in one screen, thereby minimizing steps for searching for a desired symbol. Further, a symbol set by the user can be immediately determined by displaying symbols mapped to each key of a key input unit with a QWERTY key layout, and thus a character including a symbol can be easily input, thereby improving user convenience.

23 Claims, 6 Drawing Sheets

MOBILE TERMINAL HAVING QWERTY KEY LAYOUT AND METHOD OF SETTING AND INPUTTING SYMBOL THEREIN

PRIORITY

This application claims the benefit under 35 U.S.C. §119 (a) of a Korean patent application filed in the Korean Intellectual Property Office on Jan. 23, 2008 and assigned Serial No. 10-2008-0007170, the entire disclosure of which is hereby incorporated by reference.

BACKGROUND OF THE INVENTION

1. Field of the Invention

The present invention relates to a mobile terminal having a QWERTY key layout and a method of setting and inputting a symbol therein. More particularly, the present invention relates to a mobile terminal using a QWERTY key layout and a method of setting and inputting a symbol therein that allocates symbols set by a user to QWERTY keys.

2. Description of the Related Art

With widespread use of messages written and transmitted using a mobile terminal, various methods of inputting multiple symbols (hereinafter, symbols denote special characters other than letters and numerals) using a key input unit of the mobile terminal having a limited number of keys have been developed.

In order to input a symbol, a specific key for displaying symbols is input in a message writing mode. In order to display symbols, a menu key will be input several times. For example, in order to input a symbol when writing a message with the Korean alphabet, a user inputs a menu key, and symbols are displayed in a menu form.

Thereafter, the user searches for and selects a desired symbol among a plurality of symbols displayed using a lateral direction key or a vertical direction key. Symbols are displayed in a designated layout order and cannot be managed or edited by the user.

In this way, in order to input a symbol, multiple key inputs are necessary and the user should find a desired symbol among symbols of a designated layout provided in the mobile terminal.

SUMMARY OF THE INVENTION

An aspect of the present invention is to address at least the above-mentioned problems and/or disadvantages and to provide at least the advantages described below. Accordingly, an aspect of the present invention is to provide a mobile terminal having a QWERTY key layout and a method of setting and inputting symbols therein that enable simple and quick input of symbols.

Another aspect of the present invention is to provide a mobile terminal having a QWERTY key layout and a method of setting and inputting symbols therein in which symbols set by a user are displayed in a QWERTY key form.

A further aspect of the present invention is to provide a mobile terminal having a QWERTY key layout and a method of setting and inputting symbols therein in which desired symbols can be mapped to QWERTY keys by the user.

In accordance with an aspect of the present invention, a method of inputting a symbol in a mobile terminal having a QWERTY key layout is provided. The method includes displaying, when a request for a display function of user-defined symbols is input, keys and symbols with a QWERTY key layout, and inputting, when a specific key is input, a symbol mapped to the specific input key.

In accordance with another aspect of the present invention, a method of setting a symbol in a mobile terminal having a QWERTY key layout is provided. This method includes selecting a setting function of a symbol defined by a user, adding, if the selected setting function comprises an addition function, a selected symbol to a key mapping table, deleting, if the selected setting function comprises a deletion function, a selected symbol from the key mapping table, and changing, if the selected setting function comprises a change function, a selected symbol to another selected symbol.

In accordance with yet another aspect of the present invention, a mobile terminal is provided. This terminal includes a key input unit having a QWERTY key layout, a memory unit for storing a first key mapping table in which existing characters are mapped to the QWERTY keys, a second key mapping table in which symbols are mapped to the QWERTY keys, and an existing symbol table including existing symbols, and a controller for loading, when a request for a display function of user-defined symbols is input, the second key mapping table, for controlling the display of the second key mapping table with the QWERTY key layout, for inputting, when a specific key is input, a symbol mapped to the input key, for adding, if an addition function is selected as a setting function, a selected symbol to the second key mapping table, for deleting, if a deletion function is selected as a setting function, a selected symbol from the second key mapping table, and for changing, if a change function is selected as a setting function, a selected symbol to another selected symbol in the second key mapping table.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, for convenience of description, a mobile terminal is exemplified. However, the present invention is not limited to the mobile terminal. The mobile terminal according to an exemplary embodiment of the present invention may be a mobile terminal having a QWERTY type key input unit. However, the present invention can be applied to other information and communication appliances and multimedia appliances, such as a mobile phone, wired/wireless phone, Portable Multimedia Player (PMP), Personal Digital Assistant (PDA), and smart phone, and applications thereof. Herein, the term "key" refers to at least one of a hardware key and a software key.

Figure 1:
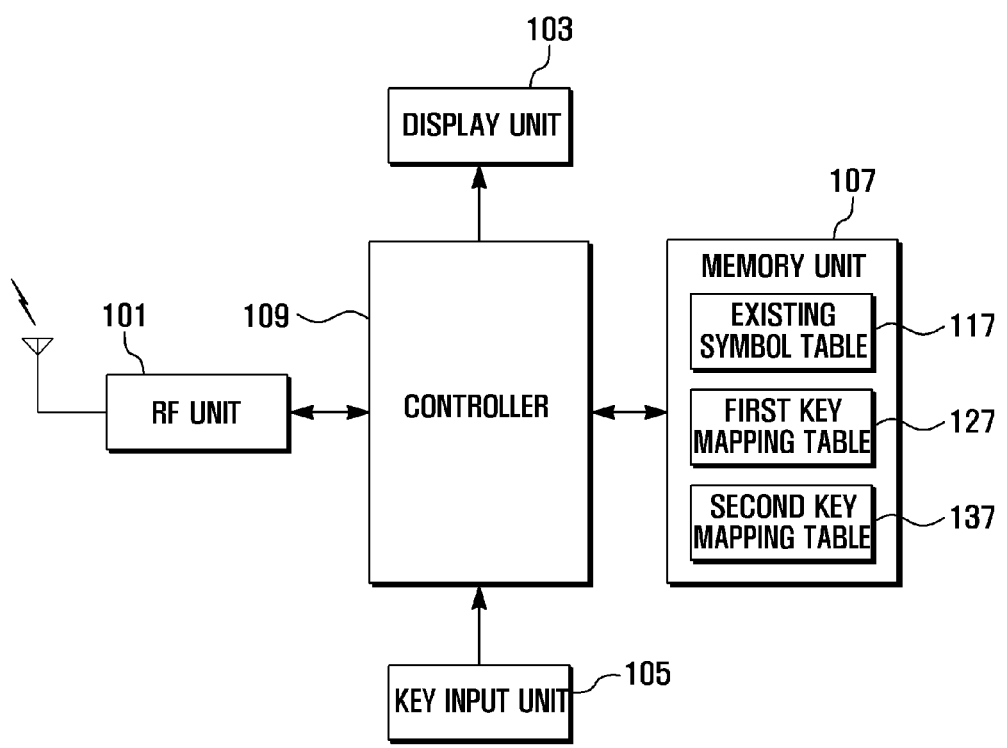
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal may include a Radio Frequency (RF) unit 101, display unit 103, key input unit 105, memory unit 107, and controller 109.

The RF unit 101 performs a wireless communication function of the mobile terminal. The RF unit 101 may include an RF transmitter (not shown) for up-converting a frequency of a signal to be transmitted and amplifying the signal, and an RF receiver (not shown) for low-noise amplifying a received signal and down-converting a frequency of the signal.

In the present exemplary embodiment, a mobile terminal including the RF unit 101 is exemplified. However, the present invention is not limited to the mobile terminal including the RF unit 101 For example, in another exemplary embodiment, a terminal may be implemented without an RF unit. That is, a method of setting and inputting a symbol according to an exemplary embodiment of the present invention can be applied even to a terminal having no communication function.

The display unit 103 visually displays various information related to a state and operation of a mobile terminal. If a request for a display function of a user-defined symbol according to the present exemplary embodiment is input, the display unit 103 may display symbols set by the user. Here, symbols may be displayed in a form of the key input unit 105, for example in a QWERTY key form. When symbols defined by the user are displayed, the display unit 103 may display the key input unit 105 having a QWERTY key layout. The display unit 103 may display a key to which a symbol is mapped by displaying the key with the corresponding symbol in an active form (for example, by highlighting the key), and may display keys having no mapped symbol in an inactive form (see a screen example illustrated in FIG. 3B, in which only the key 'Q' is highlighted). When a symbol defined by the user is displayed, the display unit 103 may display only keys to which symbols are allocated with a QWERTY key layout (see FIG. 3B) in order for the user to easily select a symbol.

The key input unit 105 is used for inputting a user's manipulation signal for controlling operations of the mobile terminal. The key input unit 105 may have a QWERTY type character layout according to the present exemplary embodiment. The QWERTY type key input unit 105 may be a key input unit in which characters are arranged with a character layout of a conventional keyboard. Because six character keys are arranged in an order of Q, W, E, R, T, and Y from the left in a first character line of a keyboard, the key input unit 105 is referred to as a QWERTY type key input unit.

Figure 3A:
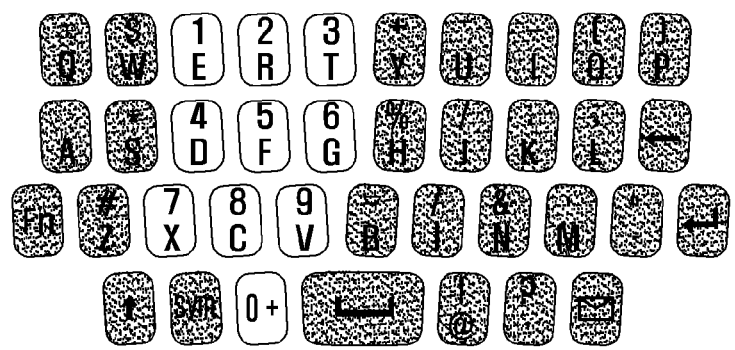
FIGS. 3A and 3B are examples of display screens illustrating an input of a symbol in the method of FIG. 2, according to exemplary embodiments of the present invention.

In the key input unit 105, English characters, numerals, specific functions, and specific symbols may be allocated to keys (see FIG. 3A). In the present exemplary embodiment, a description of specific symbols provided by a manufacturer and allocated to the key input unit 105 is omitted. The key input unit 105 may include a function key Fn and a symbol key Sym. When the symbol key Sym is input, an existing symbol table may be displayed. By pressing together the function key Fn and the symbol key Sym of the key input unit 105, symbols defined by a user according to the present exemplary embodiment may be displayed.

The memory unit 107 stores a program and information necessary for operating a mobile terminal. The memory unit 107 may store an existing symbol table 117, a first key mapping table 127, and a second key mapping table 137. The existing symbol table 117 may be a table of symbols provided when manufacturing a mobile terminal. That is, the existing symbol table 117 may be a table of symbols that is applied when a symbol key of the key input unit 105 is input. The first key mapping table 127 may be a table of characters allocated to each key provided in the key input unit 105. For example, the first key mapping table 127 may be a table in which an English character E and numeral 1 are allocated to a specific key. The second key mapping table 137 may be a table in which user-defined symbols are mapped to specific keys defined by a user.

The controller 109 controls general operations for constituent units of the mobile terminal. The controller 109 may control a method of setting and inputting a symbol in a mobile terminal using QWERTY keys according to the present exemplary embodiment. If a request for a display function of a symbol defined by a user is input, the controller 109 may control to display a symbol set by the user, for example, a symbol according to the second key mapping table 137 in the display unit 103. Here, a request for a display function of a symbol defined by the user can be performed through the input of the function key Fn and the symbol key Sym.

The controller 109 can add, delete, and change a desired symbol in the second key mapping table 137 through a function of setting a symbol defined by the user. The controller 109 may select a specific symbol in the existing symbol table 117 and may add the symbol to the second key mapping table 137. Here, it is preferable that addition of the symbol is performed in a layout order of QWERTY keys.

According to user input, the controller 109 may select a specific symbol from the displayed second key mapping table 137 and may delete the symbol. The controller 109 may select a specific symbol from the existing symbol table 117, may delete a symbol selected from the second key mapping table 137, and may replace the deleted symbol with the symbol selected from the existing symbol table 117.

Figure 2:
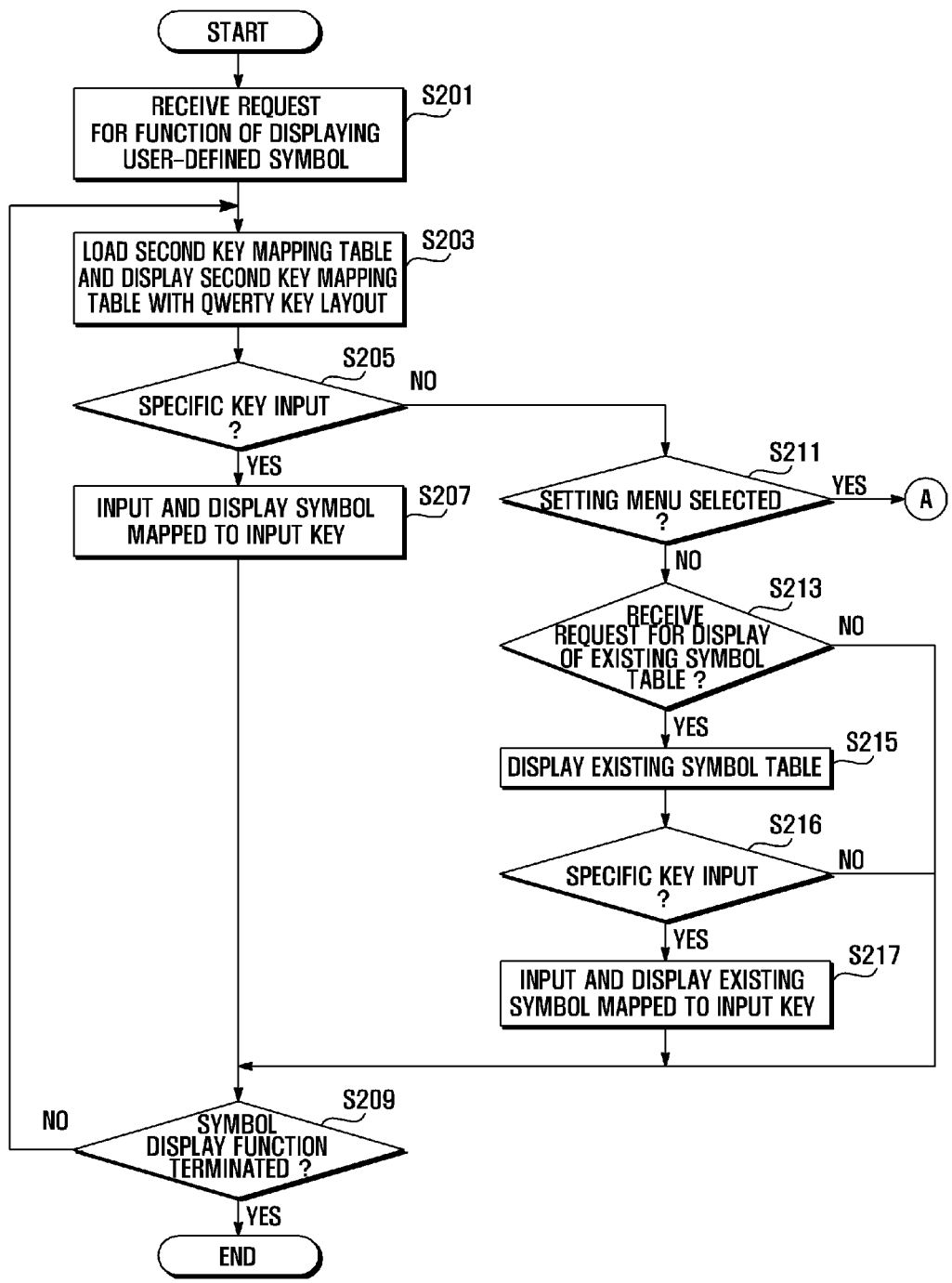
FIG. 2 is a flowchart illustrating a method of inputting a symbol in a mobile terminal according to an exemplary embodiment of the present invention.
Figure 3B:
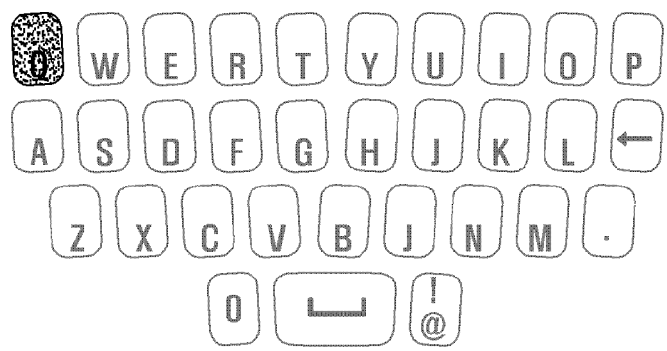

FIG. 2 is a flowchart illustrating a method of inputting a symbol in a mobile terminal according to an exemplary embodiment of the present invention, and FIGS. 3A and 3B are examples of display screens illustrating input of a symbol in the method of FIG. 2, according to exemplary embodiments of the present invention.

Referring to FIG. 2, the controller 109 may receive a request from a user for a display function of a user-defined symbol in step S201. The user can request a function of displaying a user-defined symbol through the input of a function key Fn and a symbol key Sym of the key input unit 105 in a mode of inputting a character, for example, in a mode of inputting a message, a memo pad, an e-mail and the like. The key input unit 105 having a QWERTY key layout is illustrated in FIG. 3A. As the user inputs the function key Fn and symbol key Sym in the key input unit 105, a request for a display function of a user-defined symbol may be input.

The controller 109 controls to load the second key mapping table 137 and to display the second key mapping table 137 with a QWERTY key layout in step S203. The controller 109 may control to display the second key mapping table 137 of the memory unit 107 in a QWERTY key form. A symbol of the QWERTY key form is illustrated in FIG. 3B. FIG. 3B illustrates a state where only a key Q has a specific symbol mapped thereto. The controller 109 may control to display other keys in an inactive state because no symbols are mapped to any of the other keys, and to display the key Q with a specific symbol £ in an active state because the key Q is the only key having a specific symbol, namely the symbol £, mapped thereto.

The controller 109 may determine whether a specific key is input in step S205. When the second key mapping table 137 displayed in the display unit 103 and the key input unit 105 both have the QWERTY key layout, the user can input a desired symbol by inputting a specific key on the key input unit 105 to which the desired symbol is mapped.

If a specific key is input, the controller 109 may input the symbol mapped to the input key and may display the symbol in step S207. As shown in FIG. 3B, when the user inputs the key Q, the symbol £ mapped to the key Q is input.

The controller 109 may determine whether the symbol display function is terminated in step S209. The user may terminate the function of inputting a symbol by inputting a menu key to return to a character input mode. If the symbol display function is not terminated, the process may return to step S203 wherein the second key mapping table 127 is displayed for further key input.

If a specific key is not input at step S205, the controller 109 may determine whether a setting menu is selected in step S211. In a function of displaying a user-defined symbol, the user can directly set a desired symbol to the second key mapping table 137, instead of inputting a specific symbol as described above. A method of directly setting a symbol is described further below with reference to FIG. 4. If a setting menu is selected, the controller 109 may perform a setting function, as described with reference to FIG. 4.

If a setting menu is not selected at step S211, the controller 109 may determine whether a request for display of the existing symbol table 117 is received from the user in step S213. The user may require a symbol table of an existing form instead of displaying a user-defined symbol. If a request for display of the existing symbol table 117 is not received from the user, the controller 109 may perform step S209.

If a request for display of the existing symbol table 117 is received from the user, the controller 109 may control to display the existing symbol table 117 with a QWERTY key layout in the display unit 103 in step S215. The user may request the display of the existing symbol table 117 provided by the mobile terminal for input of a symbol mapped according to the existing symbol table 117, instead of input of a user-defined symbol.

The controller 109 may determine whether a specific key is input in step S216. If a specific key is not determined to be input in step S216, the controller 109 may perform step S209. If a specific key is input, the controller 109 may input the symbol mapped to the input key in the existing symbol table 117 and may display the symbol in step S217. Thereafter, the controller 109 may perform step S209.

Figure 4:
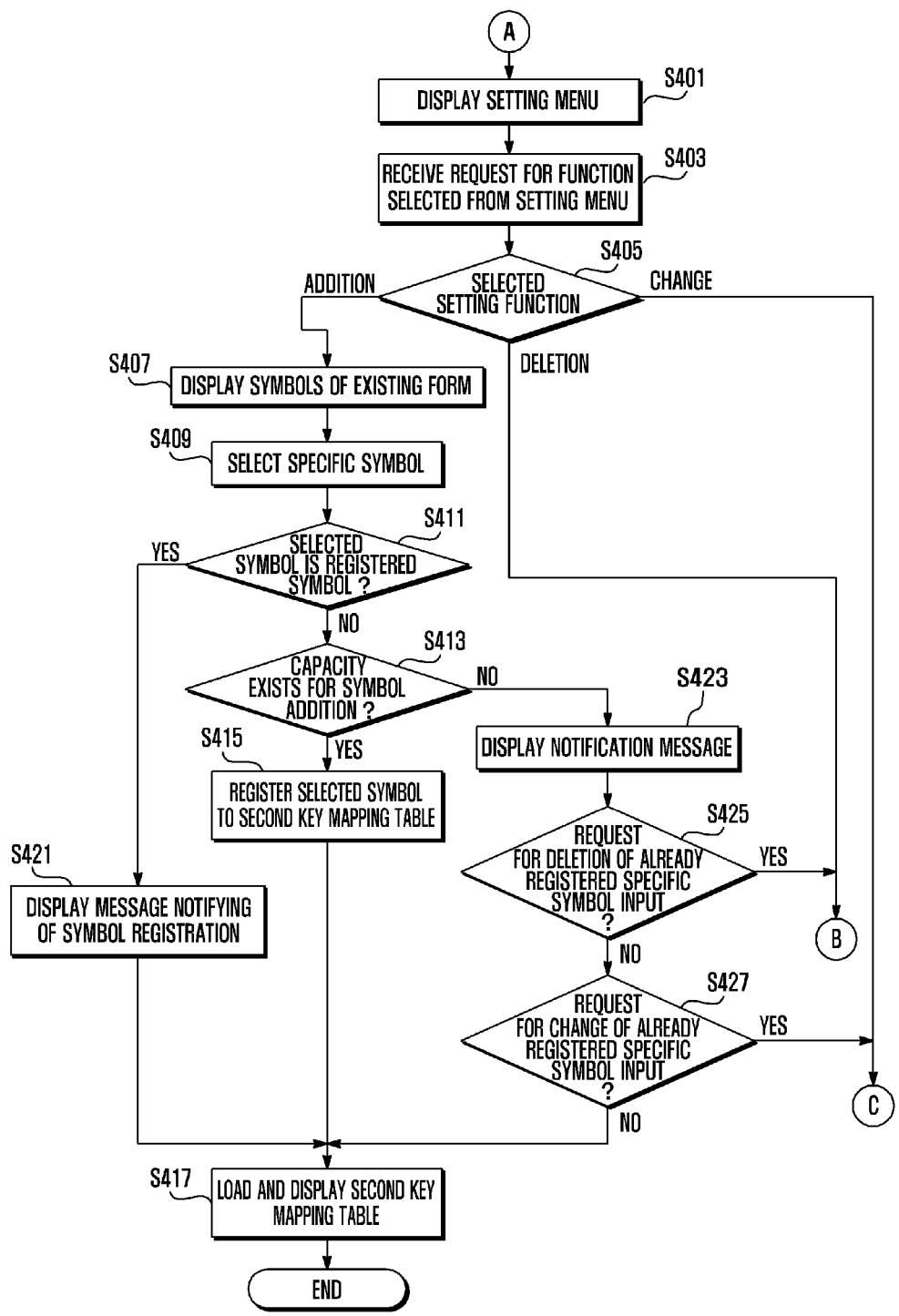
FIG. 4 is a flowchart illustrating an addition function in a method of setting a symbol in a mobile terminal according to an exemplary embodiment of the present invention.
Figure 5:
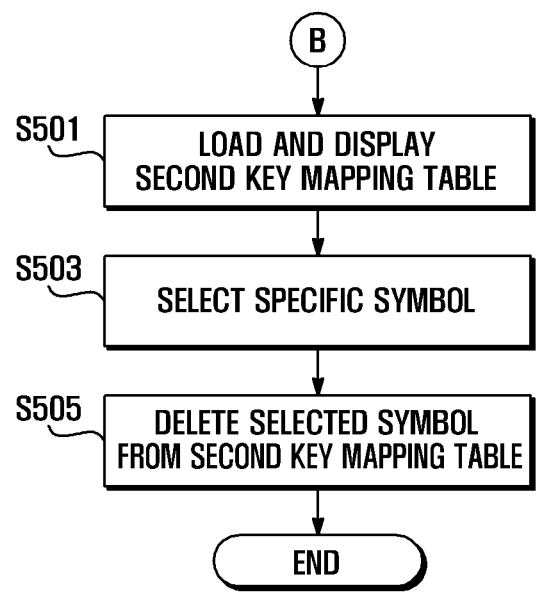
FIG. 5 is a flowchart illustrating a deletion function in the method of FIG. 4, according to an exemplary embodiment of the present invention.
Figure 6:
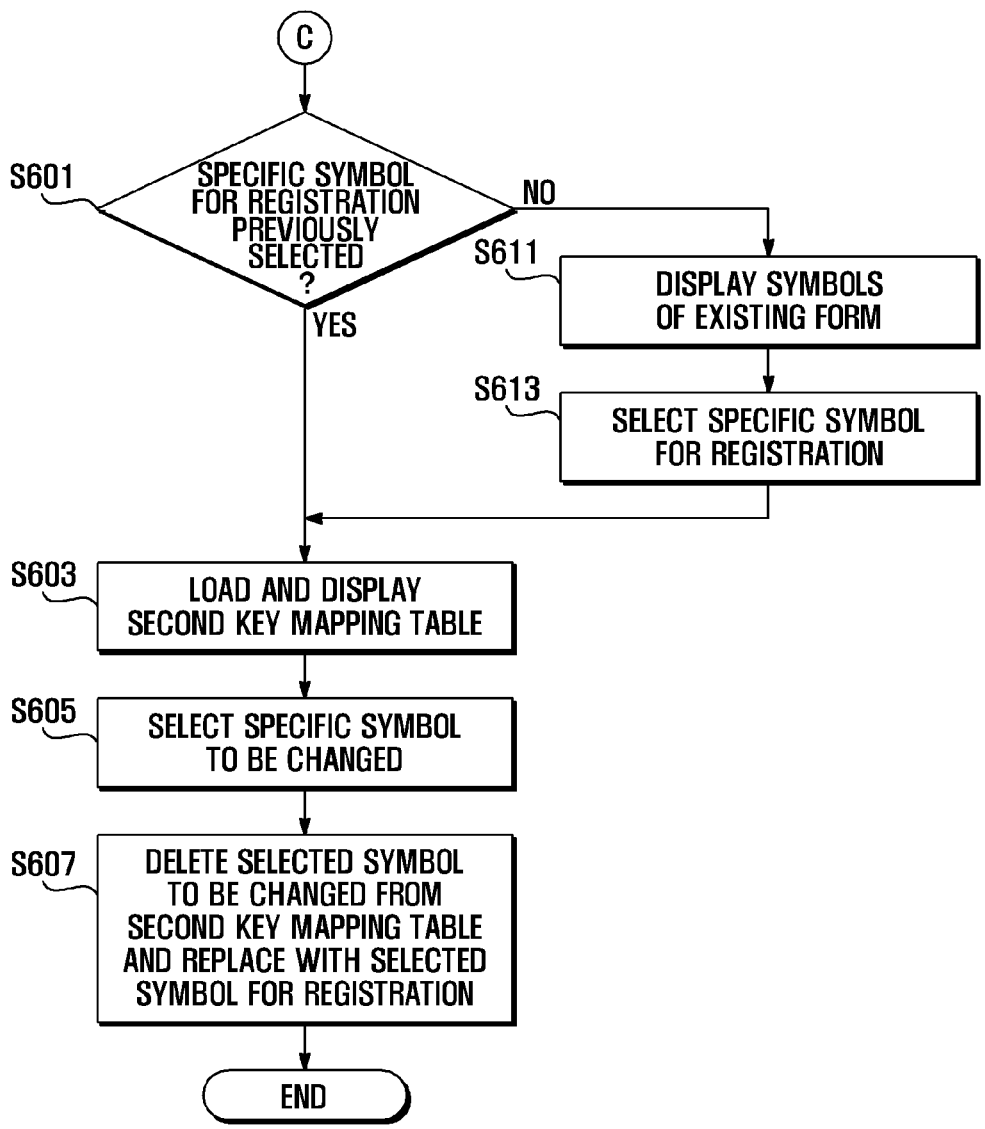
FIG. 6 is a flowchart illustrating a change function in the method of FIG. 4, according to an exemplary embodiment of the present invention.

FIG. 4 is a flowchart illustrating an addition function in a method of setting a symbol in a mobile terminal according to an exemplary embodiment of the present invention. FIG. 5 is a flowchart illustrating a deletion function in the method of FIG. 4, according to an exemplary embodiment of the present invention. FIG. 6 is a flowchart illustrating a change function in the method of FIG. 4, according to an exemplary embodiment of the present invention.

Referring to FIG. 4, the controller 109 may display the setting menu selected at step S211 of FIG. 2 in step S401.

The controller 109 may receive a request for a function selected by the user from the displayed setting menu in step S403.

The controller 109 may determine whether the selected setting function is an addition function, a deletion function, or a change function in step S405. In the present exemplary embodiment, the addition function, the deletion function, and the change function are described. However, the present invention is not limited to the selected setting functions. The deletion function is described further below with reference to FIG. 5, and the change function is described further below with reference to FIG. 6.

If the selected setting function is an addition function at step S405, the controller 109 may control to display symbols of an existing form in the display unit 103 in step S407. That is, the controller 109 may control to display the existing symbol table 117 of the memory unit 107 with a QWERTY key layout in the display unit 103.

Thereafter, the user may select a specific symbol from the existing symbol table 117 in step S409. The user can select a desired specific symbol using a navigation key and an enter key while the existing symbol table 117 is displayed.

The controller 109 may determine whether the selected symbol is a registered symbol in step S411. That is, the controller 109 may determine whether the specific symbol selected by the user is a symbol already registered in the second key mapping table 137.

If the selected symbol is already registered in the second key mapping table 137, the controller 109 may control to display a message informing thereof using the display unit 103 in step S421. The controller 109 may control to display a message notifying that the selected symbol is a symbol already registered in the second key mapping table 137 using the display unit 103 using a form such as a pop-up window. Thereafter, the controller 109 may proceed to step S417, which is described below.

If the selected symbol is not already registered in the second key mapping table 137 at step S411, the controller 109 may determine whether sufficient capacity exists in the second key mapping table 137 for symbol addition in step S413. Symbols may already be mapped to the entire second key mapping table 137 of the memory unit 107. That is, symbols may already be mapped to all 32 keys of the second key mapping table 137 displayed in the QWERTY key form.

If sufficient capacity exists in the second key mapping table 137 for symbol addition, the controller 109 may control to register the selected symbol in the second key mapping table 137 in step S415. The controller 109 may add the symbol selected at step S409 to the second key mapping table 137. Symbols may be added in a key layout order. Symbols may be sequentially added from a left key of a first line.

Finally, the controller 109 may control to load the second key mapping table 137 and may display the second key mapping table 137 having the newly registered symbol with a QWERTY key layout in the display unit 103 in step S417. Thereafter, the controller 109 may terminate the addition function.

If sufficient capacity does not exist in the second key mapping table 137 for symbol addition at step S413, the controller 109 may control to display a notification message in the display unit 103 in step S423. Because symbols are already mapped to the entire second key mapping table 137, the controller 109 may control to display a message in the display unit 103, in a form such as a pop-up window, notifying that insufficient capacity exists in the second key mapping table 137 for symbol addition.

The controller 109 may then determine whether a request for deletion of a specific symbol that is already registered is input in step S425. The user may delete a specific symbol mapped to the second key mapping table 137, thereby creating space for addition of a symbol. If a request for deletion of an already registered specific symbol is input, a deletion function of the controller 109 may be performed. The deletion function is described further below with reference to FIG. 5. FIG. 5 is a flowchart illustrating a deletion function in the method of FIG. 4, according to an exemplary embodiment of the present invention.

If a request for deletion of an already registered specific symbol is not input at step S425, the controller 109 may determine whether a request for change of an already registered specific symbol is input in step S427. The user may change an already registered specific symbol stored in the second key mapping table 137 to the symbol selected at step S409. If a request for change of an already registered specific symbol is input, a change function of the controller 109 may be performed. The change function is described further below with reference to FIG. 6.

If a request for change of an already registered specific symbol is not input at step S427, the controller 109 performs step S417.

A deletion function in the method of setting a symbol in a mobile terminal of FIG. 4 is described below with reference to FIG. 5.

Referring to FIG. 5, if the function selected at step S405 of FIG. 4 is a deletion function, the controller 109 may control to load the second key mapping table 137 and display the second key mapping table 137 with a QWERTY key layout in the display unit 103 in step S501. This process may alternatively be performed when a request for deletion of an already registered specific symbol is input at step S425.

Thereafter, the user may select a specific symbol to delete among symbols mapped to the second key mapping table 137 in step S503.

The controller 109 may then control to delete the selected symbol from the second key mapping table 137 in step S505. Here, if the symbol selected for deletion is a symbol mapped to the last key of a QWERTY key layout, the controller 109 may delete the symbol mapped to the last key. If a symbol selected for deletion is a symbol mapped to the first key or an intermediate key of a QWERTY key layout, the controller 109 may control to sequentially move each symbol that is mapped to a key after the key to which the deleted symbol is mapped to an adjacent key in the direction of the key to which the symbol is deleted, and to re-map the symbols to the keys. Alternatively, the controller 109 may simply delete the selected symbol without moving and re-mapping other symbols and may leave the key to which the deleted symbol is mapped without a mapped symbol.

After deletion of the selected symbol at step S505, the controller 109 may terminate the deletion function.

A change function in the method of setting a symbol in a mobile terminal is described with reference to FIG. 6. FIG. 6 is a flowchart illustrating a change function in the method of FIG. 4, according to an exemplary embodiment of the present invention.

Referring to FIG. 6, the controller 109 may determine whether a specific symbol was previously selected for registration in the second key mapping table 137 in step S601. If the change function is selected at step S405 of FIG. 4, no specific symbol was previously selected for registration. If, however, a request for change of an already registered specific symbol is input at step S427 of FIG. 4, a specific symbol was previously selected for registration at step S409 of FIG. 4.

If no specific symbol was previously selected for registration at step S601, the controller 109 may control to display symbols of an existing form in step S611. That is, the controller 109 may control to display the existing symbol table 117 with a QWERTY key layout in the display unit 103, in order to select a specific symbol to add by the change function. The user may then select a specific symbol for registration from the existing symbol table 117 in step S613.

If a specific symbol was previously selected for registration at step S601, or if a specific symbol was selected for registration at step S613, the controller 109 may control to load the second key mapping table 137 and may display the second key mapping table 137 with a QWERTY key layout in the display unit 103 in step S603.

Thereafter, the user may select a specific symbol to be changed among symbols mapped to the second key mapping table 137 in step S605.

The controller 109 may then control to delete the specific symbol selected to be changed at step S605 from the second key mapping table 137, and may replace it with the specific symbol selected for registration in step S607. The controller 109 may control to map the symbol selected for registration to a key to which the deleted symbol was mapped.

After mapping the symbol, the controller 109 may terminate the change function.

According to exemplary embodiments of the present invention, symbols frequently used by a user can be viewed in one screen, thereby minimizing steps for searching for a desired symbol. Further, a symbol set by the user can be immediately determined by displaying symbols mapped to each key of a key input unit with a QWERTY key layout, and thus a character including a symbol can be easily input, thereby improving user convenience.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of inputting a symbol in a mobile terminal, the method comprising:
displaying, when a request for a display function of user-defined symbols is input, keys and user-defined symbols with a key layout; and inputting, when a specific key is input, a user-defined symbol mapped to the specific input key, wherein the user-defined symbols comprise characters, other than letters and numerals, which are set by a user to be mapped to keys of the key layout.

2. The method of claim 1, wherein the displaying of the keys and user-defined symbols with the key layout comprises displaying the user-defined symbols mapped to each of the keys.

3. The method of claim 1, wherein the displaying of the keys and user-defined symbols with the key layout comprises requesting a display function of user-defined symbols through the input of at least one key.

4. The method of claim 1, wherein the displaying of the keys and user-defined symbols with the key layout comprises displaying keys in an inactive state that do not have a user-defined symbol mapped thereto and displaying keys in an active state that have a user-defined symbol mapped thereto.

5. A method of setting a symbol in a mobile terminal, the method comprising:

selecting one of an addition function, a deletion function, and a change function of a symbol defined by a user;

adding, if the addition function is selected, a symbol selected by the user to a key mapping table;

deleting, if the deletion function is selected, a symbol selected by the user from the key mapping table; and changing, if the change function is selected, a symbol selected by the user to another symbol selected by the user, wherein the symbol comprises a character other than a letter and a numeral.

6. The method of claim 5, wherein the adding of the selected symbol to the key mapping table comprises:

displaying an existing form of a symbol table and selecting, by the user, a specific symbol therefrom;

determining whether the selected symbol is a symbol registered in the key mapping table;

determining, if the selected symbol is not a symbol registered in the key mapping table, whether sufficient capacity exists in the key mapping table for addition of the selected symbol; and adding, if sufficient capacity exists in the key mapping table for addition of the selected symbol, the selected symbol to the key mapping table.

7. The method of claim 6, wherein the adding of the selected symbol comprises adding the selected symbol to the key mapping table in a layout order of the keys.

8. The method of claim 5, wherein the deleting of the selected symbol from the key mapping table comprises:

displaying the key mapping table and selecting, by the user, a specific symbol; and deleting the selected symbol from the key mapping table.

9. The method of claim 8, wherein the key mapping table includes a key layout and further wherein the deleting of the selected symbol from the key mapping table comprises:

if the selected symbol is mapped to a first key or an intermediate key of the key layout, each symbol that is mapped to a key after a key to which the deleted selected symbol is mapped is sequentially remapped to an adjacent key in the direction of the key to which the selected symbol is deleted.

10. The method of claim 8, wherein the key mapping table includes a key layout and further wherein the deleting of the selected symbol from the key mapping table comprises deleting the selected symbol without remapping unselected symbols.

11. The method of claim 5, wherein the changing of the selected symbol to another selected symbol comprises:

determining whether a specific symbol for addition was previously selected;

displaying, if no specific symbol for addition was previously selected, an existing form of a symbol table and selecting a specific symbol for addition therefrom;

displaying the key mapping table and selecting a specific symbol for deletion;

deleting the symbol selected for deletion from the key mapping table; and replacing the deleted symbol with the symbol selected for addition.

12. The method of claim 5, further comprising:

displaying a setting menu; and receiving a request for a function selected by the user from the displayed setting menu.

13. A mobile terminal, the terminal comprising:

a key input unit having a key layout;

a memory unit for storing a first key mapping table in which existing characters are mapped to the keys, a second key mapping table in which symbols defined by a user are mapped to the keys, and an existing symbol table including existing symbols; and a controller for loading, when a request for a display function of user-defined symbols is input, the second key mapping table, for controlling the display of the second key mapping table with the key layout, for inputting, when a specific key is input, a symbol mapped to the input key, for adding, if an addition function is selected as a setting function, a symbol selected by the user to the second key mapping table, for deleting, if a deletion function is selected as a setting function, a symbol selected by the user from the second key mapping table, and for changing, if a change function is selected as a setting function, a symbol selected by the user to another symbol selected by the user in the second key mapping table, wherein the symbols comprise characters other than letters and numerals.

14. The terminal of claim 13, wherein the controller controls to display symbols mapped to each of the keys when the second key mapping table is displayed.

15. The terminal of claim 13, wherein the key input unit further comprises at least one key for input of a request for a display function of user-defined symbols.

16. The terminal of claim 13, wherein the controller controls to display, if the addition function is selected, the existing symbol table, to determine, when a specific symbol is selected therefrom, whether the selected symbol is a symbol registered in the second key mapping table, to determine, if the selected symbol is not a symbol registered in the second key mapping table, whether sufficient capacity exists in the second key mapping table for addition of the selected symbol, and to add, if sufficient capacity exists in the second key mapping table for addition of the selected symbol, the selected symbol to the second key mapping table.

17. The terminal of claim 16, wherein the controller controls to add the selected symbol to the second key mapping table in a layout order of the keys.

18. The terminal of claim 16, wherein the controller controls to perform the deletion function or the change function when a capacity of the second key mapping table is exceeded.

19. The terminal of claim 13, wherein the controller controls to display, if the deletion function is selected, the second key mapping table, to select a specific symbol, and to delete the selected symbol from the second key mapping table.

20. The terminal of claim 13, wherein the controller determines, if the change function is selected, whether a specific symbol for addition was previously selected, and controls to display, if no specific symbol for addition was previously selected, the existing symbol table and select a specific symbol for addition therefrom, to display the second key mapping table and select a specific symbol for deletion, to delete the symbol selected for deletion from the second key mapping table, and to replace the deleted symbol with the symbol selected for addition.

21. The terminal of claim 13, wherein the keys comprises at least one of hardware keys and software keys.

22. The method of claim 1, wherein the keys comprises at least one of hardware keys and software keys.

23. The method of claim 5, wherein the keys comprises at least one of hardware keys and software keys.

\* \* \* \* \*